US006618919B1

(12) United States Patent
McKay

(10) Patent No.: US 6,618,919 B1
(45) Date of Patent: Sep. 16, 2003

(54) REMOTE ACTUATION OF INSTALLATION TOOLING PUMP

(76) Inventor: Albert A. McKay, 107 Lake Avenue Drive, Stoney Creek, Ontario (CA), L8G 1X8

( * ) Notice: Subject to any disclaimer, the term of this patent is extended or adjusted under 35 U.S.C. 154(b) by 0 days.

(21) Appl. No.: 09/677,921

(22) Filed: Oct. 3, 2000

(51) Int. Cl.[7] .................................................. B23P 19/04
(52) U.S. Cl. .............................. 29/237; 29/252; 29/282
(58) Field of Search .......................... 29/235, 252, 282, 29/234

(56) References Cited

U.S. PATENT DOCUMENTS 4,392,263 A * 7/1983 Amoroso ................... 29/566.1
4,512,072 A * 4/1985 Graham ........................ 29/235
4,688,327 A * 8/1987 Cooper et al. ................ 29/723
4,989,308 A * 2/1991 Sanders ..................... 29/243.5
5,134,776 A * 8/1992 Moody ......................... 30/180
5,305,510 A * 4/1994 Croft et al. .................... 29/237
5,483,731 A * 1/1996 Prendel et al. ................ 29/252

* cited by examiner

*Primary Examiner*—Robert C. Watson
(74) *Attorney, Agent, or Firm*—Fay, Sharpe, Fagan, Minnich & McKee, LLP

(57) ABSTRACT

A hydraulic assembly system is described. The system includes a hydraulic assembly tool connected by a hydraulic connection to a hydraulic pressure source which supplies a pressurized hydraulic fluid to the tool. The system includes a switch mounted on the hydraulic assembly tool and one or more signal connections between the switch and the hydraulic pressure source whereby activation of the switch causes the hydraulic pressure source to supply the pressurized hydraulic fluid to activate the hydraulic assembly tool.

21 Claims, 4 Drawing Sheets

REMOTE ACTUATION OF INSTALLATION TOOLING PUMP

CROSS-REFERENCE TO RELATED APPLICATIONS

This patent application is closely related to the following patent application: LOKRING® FITTING HAVING IMPROVED ANTI-TORSION CAPABILITY. The referenced application is being filed concurrently with the present application.

1. Field of the Invention

The present invention relates, in general, to hydraulically actuated assembly tools and, more particularly, the present invention relates to assembly tools for LOKRING® fittings.

2. Background of the Invention

One type of fitting for fluid pressure conduits such as tubes or pipes has a connector body which fits loosely over the tube or pipe and a LOKRING® or swage ring which compresses the connector body against the outside surface of the tube or pipe to provide one or more seals and to provide a strong mechanical connection.

A prior art tool for assembling the fitting to the tube or pipe is described in U.S. Pat. No. 5,305,510, which is entitled: HYDRAULIC ASSEMBLY TOOL WITH IMPROVED LOAD BEARING ARRANGEMENT FOR TUBE FITTINGS. A prior art fitting of the type discussed is presented in U.S. Pat. No. 5,114,191, which is entitled: PIPE FITTING WITH COUPLING BODY AND IMPROVED ISOLATION TOOTH ARRANGEMENT.

Prior art tools, generally, consist of hydraulic cylinders which move a moveable jaw relative to a fixed jaw. The jaws are configured to grip the LOKRING® or swage ring and the connector body to force the LOKRING® or swage ring over the connector body so that the connector body engages the tube to provide the required seal and strong mechanical connection.

Hydraulic power is supplied by a pump which is driven by an electrical motor, and a switch is provided for energizing the motor so that the hydraulic power is supplied, and the tool forces the LOKRING® or swage ring onto the connector body. The switch may be placed on the floor or any flat surface so that an operator of the tool may activate it by applying his or her foot or hand to the switch.

If the operator is on a ladder, or otherwise located where it is not convenient to place the switch, a second person is needed to activate the switch. This tends to slow production inasmuch as coordination of two persons is required, and introduces safety issues related to communication between the two persons.

The teachings of the copending application cited above and the issued U.S. Pat. Nos. 5,114,191 and 5,305,510 are hereby incorporated into the present application by reference thereto.

SUMMARY OF THE INVENTION

The present invention is a hydraulic assembly system. It has a hydraulic assembly tool connected by a hydraulic connection to a hydraulic pressure source which supplies a pressurized hydraulic fluid to the tool. The system includes a switch mounted on the hydraulic assembly tool and one or more signal connections between the switch and the hydraulic pressure source whereby activation of the switch causes the hydraulic pressure source to supply the pressurized hydraulic fluid to activate the hydraulic assembly tool.

OBJECTS OF THE INVENTION

It is therefore one of the primary objects of the present invention to provide a hydraulic assembly tool which may be employed by a single person.

Another object of the present invention is to provide a hydraulic assembly tool for attaching fluid fittings to tubes or pipes which may be employed by a single person.

Still another object of the present invention is to provide features for a hydraulic assembly tool which substantially prevents inadvertent actuation of the tool.

Yet another object of the present invention is to provide a hydraulic assembly tool which may be positioned and operated by one hand.

A further object of the present invention is to provide a hydraulic assembly tool with low voltage electrical controls.

It is an additional object of the present invention to provide a hydraulic assembly tool which may be employed by a person on a ladder.

Yet another object of the present invention is to provide a hydraulic assembly tool which may be employed by a person in a location remote from the source of hydraulic power.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
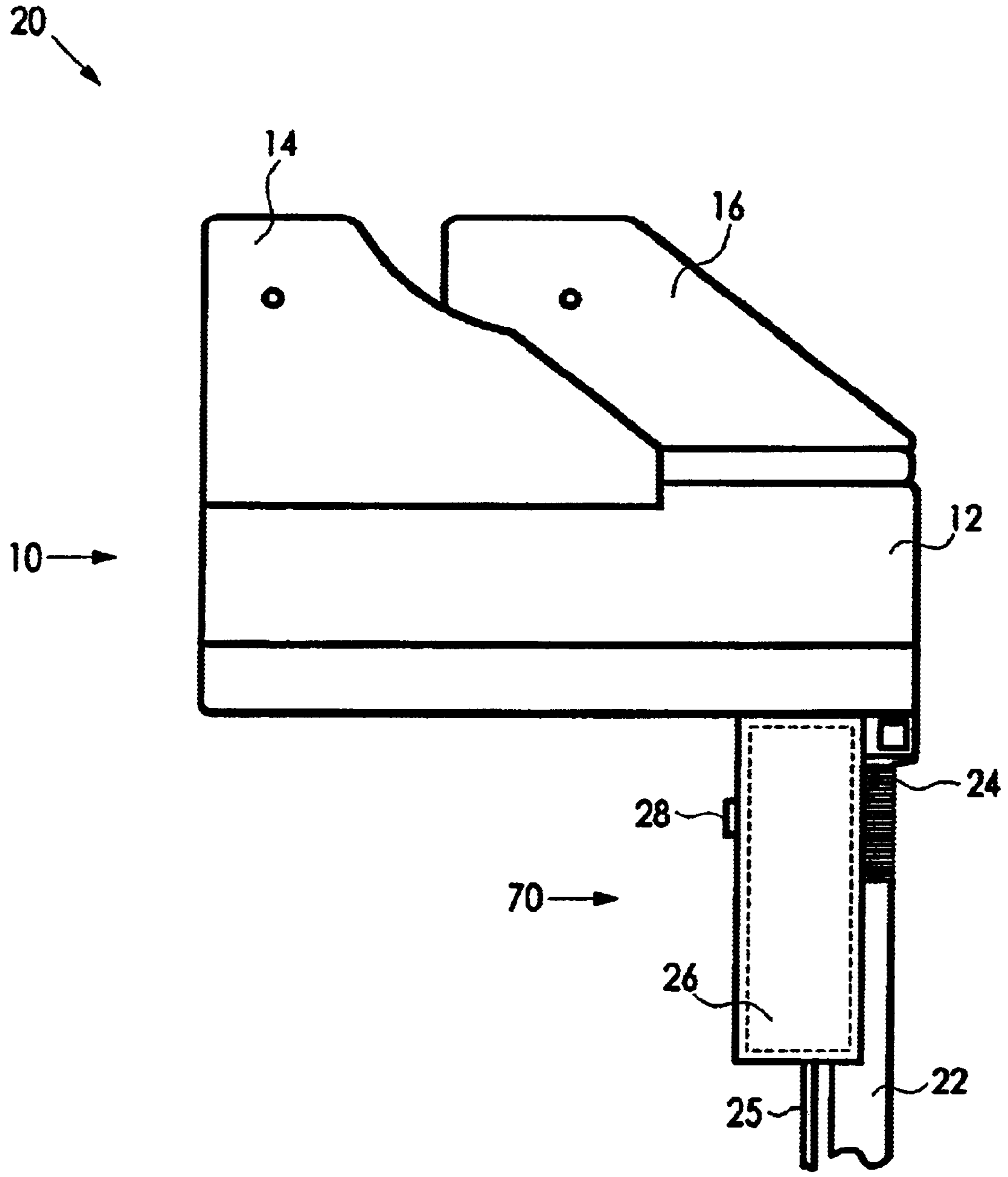
FIG. 1 is a schematic illustration of an embodiment of the present invention having a tool with a handle on which a switch is mounted for controlling pressure to the tool.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Attention is directed to FIG. 1, which schematically illustrates an embodiment of the present invention. FIG. 1 illustrates an installation tool assembly, generally designated 20, having a hydraulic connection 22, preferably a hydraulic hose, for supplying hydraulic power to an installation tool, generally designated 10.

Installation tool 10 includes a hydraulic cylinder 12, a fixed jaw 14 and a moveable jaw 16. Additional detail regarding installation tool 10 is provided in prior art patent U.S. Pat. No. 5,305,510.

Figure 4:
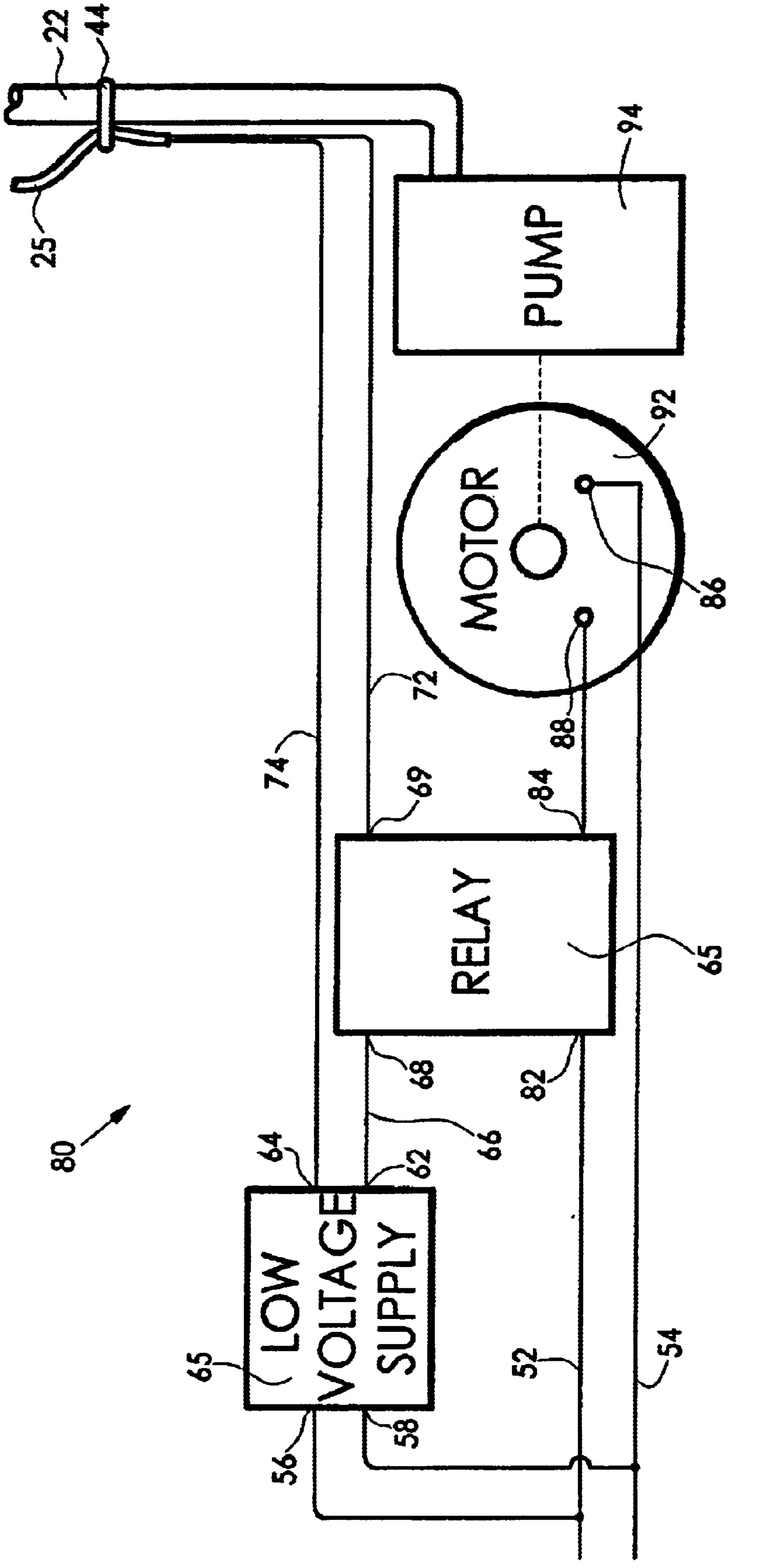
FIG. 4 is a schematic illustration of the presently preferred embodiment of the hydraulic pressure supply and its controls, according to the present invention.

Hydraulic hose 22 is attached to installation tool 10 by hose termination 24. The installation tool assembly 20 includes a handle, generally designated 70, having a switch 26 and a switch activation member 28. The switch 26 is connected to signal connection 25. Switch 26 is employed to turn on a source of hydraulic power, shown subsequently in FIG. 4. The hydraulic power causes relative movement of jaws 14 and 16 for assembling a pair of workpieces (not shown). Electrical and hydraulic supplies for installation tool assembly 20 are shown in FIG. 4.

Figure 2:
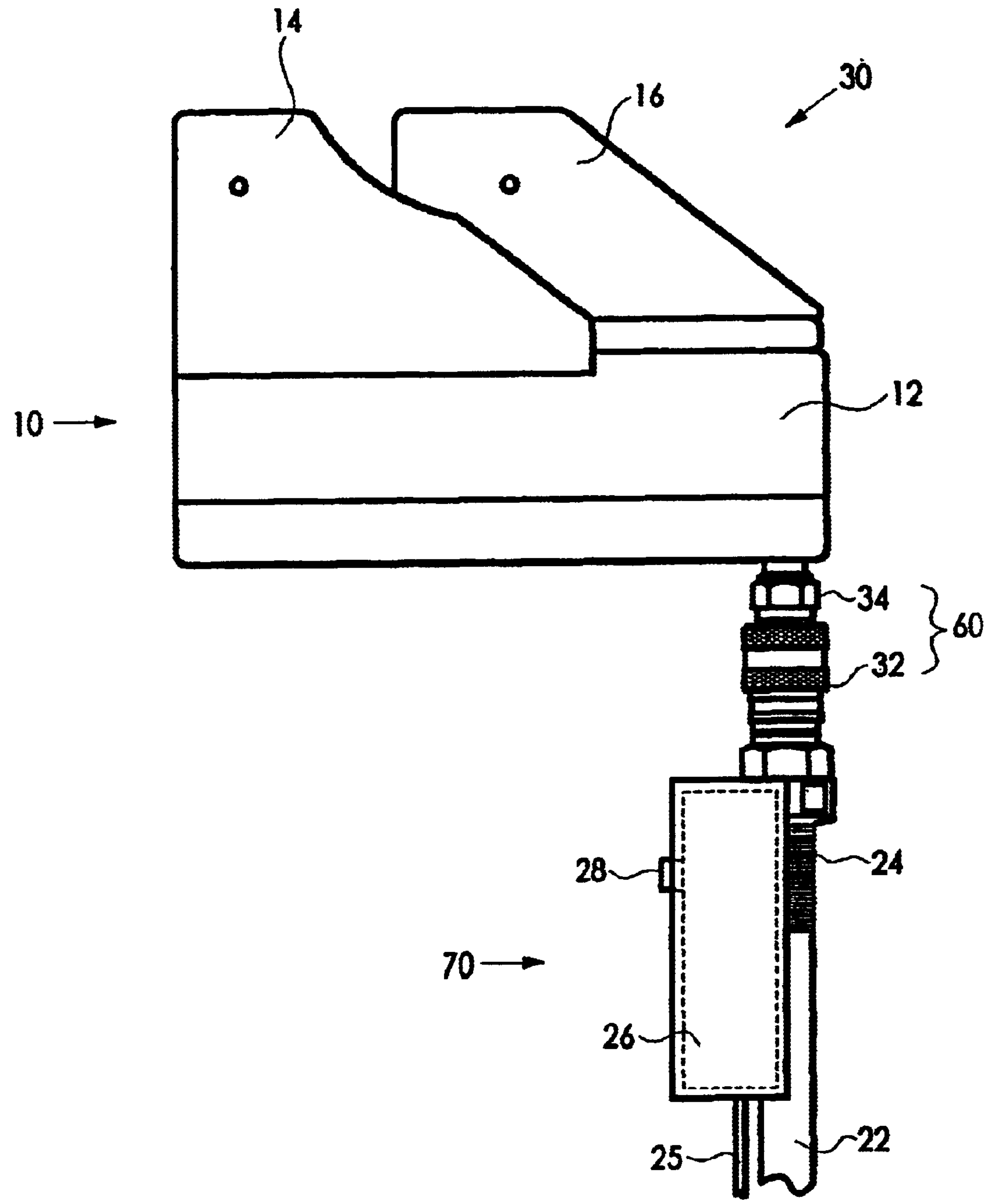
FIG. 2 is a schematic illustration of an embodiment of the present invention similar to the embodiment of FIG. 1, which further includes a quick disconnect.

FIG. 2 illustrates an embodiment of the present invention having a quick disconnect, generally designated 60, which includes each of a quick disconnect male side 32 and a quick disconnect female side 34. As in the embodiment of FIG. 1, the installation tool 10 includes a hydraulic cylinder 12, a fixed jaw 14 and a moveable jaw 16. Likewise, tool 30 has a handle 70 including a switch 26 and switch activation member 28. Switch 26 is connected to signal connection 25. Hydraulic hose 22 is connected to quick disconnect male side 32 by hose termination 24, the quick disconnect female side 34 being attached to installation tool 10.

Figure 3:
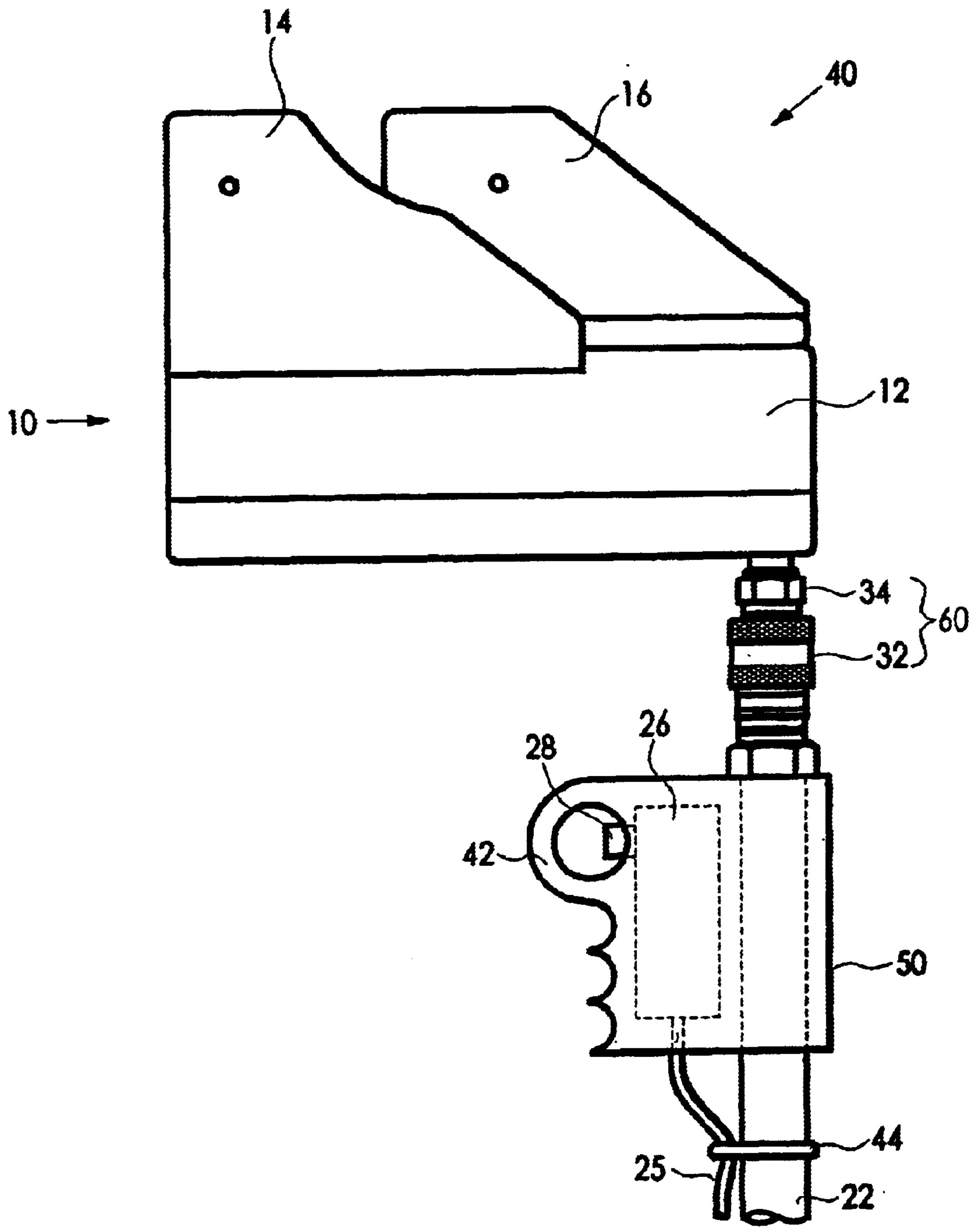
FIG. 3 is a schematic illustration of the presently preferred embodiment of the invention in which the handle is formed as a pistol grip.

FIG. 3 illustrates the presently preferred embodiment of the present invention. The installation tool assembly, generally designated 40, includes installation tool 10 having hydraulic cylinder 12, fixed jaw 14 and moveable jaw 16.

Installation tool 10 is connected by quick disconnect 60 to a pistol grip handle, generally designated 50. Quick disconnect 60 includes quick disconnect male side 32 and quick disconnect female side 34. Switch 26 is contained in handle 50 and switch activation member 28 is protected by activation member guard 42. The purpose of activation member guard 42 is to prevent inadvertent actuation of installation tool 10.

Signal connection 25 is connected to switch 26. Preferably, signal connection 25 is mechanically attached to hydraulic hose 22 by ties 44.

FIG. 4 illustrates schematically the general features of the hydraulic pressure source, generally designated 80. Electrical power is supplied by electrical power line 52 and electrical return line 54. Electrical lines 52 and 54 are connected to input terminals 56 and 58 of low voltage supply 65, which provides low voltage power on low voltage terminals 62 and 64. The low voltage power supplied by low voltage power supply 65 may be either DC or AC. Low voltage line 74 is connected to low voltage terminal 64. Low voltage line 66 is connected to the low voltage terminal 62 and to the first control terminal 68 of relay 65, and the second control terminal 69 of such relay 65 is connected to low voltage line 72. Low voltage lines 72 and 74, preferably, are brought together as signal connection 25 and connected to switch 26, which is shown in FIGS. 1, 2, and 3. When switch activation member 28 is pressed, switch 26 is closed, and low voltage current flows through the control side of relay 65. This closes the conduction path inside relay 65 (not shown) to supply electrical power to motor power terminal 88. Electrical current returns from electrical motor 92 through power terminal 86 to electrical power line 54.

When a person operates this system, he or she connects electrical power to power terminals 52 and 62. The installation tool 10 is then engaged with the workpieces being assembled. The workpieces may, for example, be a tube or pipe fitting, and a swage ring to force the fitting into engagement with the tube or pipe.

When the workpieces are in place and the tool is properly engaged with the workpieces, the operator presses the switch activation member 28 to activate the installation tool 10, and thereby assemble the workpieces.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

I claim:

1. A hand held assembly system for attaching a fitting to a tube, said hand held assembly system comprising:

(a) a hydraulically powered assembly tool fluidly connected to an associated hydraulic pressure source including an electric motor and pump for supplying a pressurized hydraulic fluid to said assembly tool;

(b) said hydraulically powered assembly tool including a fixed jaw and a hydraulically moveable jaw for forcing together a tube or pipe fitting;

(c) a hydraulic connection which enables quick connection and disconnection of said associated hydraulic pressure source to and from, respectively, said hydraulically powered assembly tool;

(d) a switch mounted one of closely adjacent and on said hydraulic connection so that only after said hydraulic connection is made said switch is positioned adjacent said assembly tool;

(e) at least one signal connection between said switch and said hydraulic pressure source whereby activation of said switch causes said hydraulic pressure source to supply said pressurized hydraulic fluid to activate said hydraulically powered assembly tool.

2. A hand held hydraulic assembly system, according to claim 1, wherein said switch is an electric switch and said at least one signal connection is at least two electrical conductors.

3. A hand held hydraulic assembly system, according to claim 1, wherein said hydraulic pressure source is a pump.

4. A hand held hydraulic assembly system, according to claim 3, wherein said pump is driven by an electrical motor.

5. A hand held hydraulic assembly system, according to claim 4, wherein said switch is an electrical switch, and said at least one signal connection is at least two electrical conductors connected to control power to said electrical motor.

6. A hand held hydraulic assembly system, according to claim 4, wherein said switch is an electrical switch, and said at least one signal connection is at least two electrical conductors connected to a relay controlling electrical power to said electrical motor.

7. A hand held hydraulic assembly system, according to claim 6, wherein said system further includes a low voltage electrical supply for supplying a low voltage, said low voltage electrical supply connected to at least one of said at least two electrical conductors, so that said electrical conductors carry said low voltage.

8. A hand held hydraulic assembly system, according to claim 7, whereby said low voltage is one of equal to and less than about 12 Volts.

9. A hand held hydraulic assembly system, according to claim 7, wherein said low voltage is a low DC voltage.

10. A hand held hydraulic assembly system, according to claim 7, wherein said low voltage is a low AC voltage.

11. A hand held hydraulic assembly system, according to claim 1, further including:

a hydraulic hose connecting said associated hydraulic pressure source to said hydraulic assembly tool, said hose having a handle adjacent one end that forms a portion of said hydraulic connection, said hose disconnectable from said assembly tool which thereby disconnects said handle from said assembly tool.

12. A hand held hydraulic assembly system, according to claim 11, wherein said switch is mounted at least one of on and within said handle.

13. A hand held hydraulic assembly system, according to claim 12, wherein said handle is shaped as a pistol grip having a switch activation member for activating said switch.

14. A hand held hydraulic assembly system, according to claim 13, wherein said system further includes an activation member guard to prevent inadvertent actuation of said tool.

15. A hand held hydraulic assembly system, according to claim 1, wherein said fix jaw engages a first workpiece and said moveable jaw engages a second workpiece, whereby actuation of said assembly tool forcibly engages said second workpiece with said first workpiece.

16. A hand held hydraulic assembly system, according to claim 1, wherein said fixed jaw and said moveable jaw assemble a tube fitting with a LOKRING® to join said tube fitting to a tube.

17. A hand held hydraulic assembly system, according to claim 1, wherein said fixed jaw and said moveable jaw assemble a pipe fitting with a LOKRING® to join said pipe fitting to a pipe.

18. An assembly tool for a tube or pipe fitting for joining ends of a pair of tubes or pipes by application of opposing forces on a fitting used to connect said ends of a pair of tubes or pipes, the assembly tool comprising:

a body structure including a hydraulic cylinder;

a first jaw member formed by said body structure;

a second jaw member slidably mounted to said body structure and moveable relative to said first jaw member;

a piston moveably received in said hydraulic cylinder along a longitudinal axis;

a port defined in said body structure and in fluid communication with said hydraulic cylinder on one side of said piston; said piston adapted to move said second jaw member toward said first jaw member when a hydraulic pressure enters said port and moves said piston, said port including a first hydraulic connection structure which enables relatively quick connection and disconnection thereto;

a hydraulic pressure source remotely located relative to said body structure for supplying said hydraulic pressure to said hydraulic cylinder through said port; and a hydraulic hose for communicating said hydraulic pressure from said pressure source to said cylinder, said hose fluidly connected at one end to said pressure source and including adjacent an opposite end:

a second hydraulic connection structure releasably connected to said first hydraulic connection structure, said second hydraulic structure also enables relatively quick connection and disconnection thereto, and a switch adjacent said second connection structure for controlling when said pressure source supplies said hydraulic pressure to said cylinder, activation of said switch causes said pressure source to supply said hydraulic pressure to said cylinder thereby moving said second jaw member toward said first jaw member.

19. An assembly tool comprising:

a hydraulically powered clamping tool;

a hydraulic pressure source positioned relatively remotely from said clamping tool for generating a hydraulic pressure;

a hydraulic communication line connected at a first end to said hydraulic pressure source, a second, opposite end of said communication line is removably connected to said hydraulically powered clamping tool;

a switch mounted on said communication line adjacent said second end of said communication line, said switch electrically connected to said hydraulic pressure source for actuating said hydraulic pressure source upon depression of an activation member provided on said switch, actuation of said switch communicates a generated hydraulic pressure from said hydraulic pressure source through said communication line to said hydraulically powered clamping tool.

20. The assembly tool of claim 19 further including:

a quick connect between said second end of said communication line and said hydraulically powered clamping tool.

21. The assembly tool of claim 19 wherein a user can hold said tool in one hand and actuate said switch with said one hand.

* * * * *